United States Patent
Bertsch

(10) Patent No.: US 10,968,814 B2
(45) Date of Patent: Apr. 6, 2021

(54) INTERNAL COMBUSTION ENGINE FOR A MOTOR VEHICLE

(71) Applicant: Daimler AG, Stuttgart (DE)

(72) Inventor: Dietmar Bertsch, Aspach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/753,300

(22) PCT Filed: Sep. 21, 2018

(86) PCT No.: PCT/EP2018/075618
§ 371 (c)(1),
(2) Date: Apr. 2, 2020

(87) PCT Pub. No.: WO2019/068484
PCT Pub. Date: Apr. 11, 2019

(65) Prior Publication Data
US 2020/0240321 A1    Jul. 30, 2020

(30) Foreign Application Priority Data

Oct. 4, 2017 (DE) .................. 10 2017 009 228.1

(51) Int. Cl.
*F02B 19/08* (2006.01)
*F02B 19/18* (2006.01)
(Continued)

(52) U.S. Cl.
CPC .............. *F02B 19/18* (2013.01); *F02B 19/08* (2013.01); *F02B 19/1019* (2013.01);
(Continued)

(58) Field of Classification Search
CPC .......... F02B 19/08; F02B 19/12; F02B 19/18; F02B 23/101; F02B 23/105
(Continued)

(56) References Cited

U.S. PATENT DOCUMENTS 4,224,902 A * 9/1980 Binder ................ F02B 19/14
                                                   123/280
4,270,498 A   6/1981 Occella et al.
(Continued)

FOREIGN PATENT DOCUMENTS

DE    29 15 514 A1    10/1979
DE    29 16 285 A1    11/1980
(Continued)

OTHER PUBLICATIONS

PCT/EP2018/075618, International Search Report dated Nov. 9, 2018 (Two (2) pages).
(Continued)

*Primary Examiner* — Erick R Solis
(74) *Attorney, Agent, or Firm* — Crowell & Moring LLP

(57) ABSTRACT

An internal combustion engine for a motor vehicle has at least one cylinder for accommodating a piston and at least one pre-chamber spark plug allocated to the combustion chamber of the cylinder. The engine also has a pre-chamber, fluidically connected with the combustion chamber via several openings, in which at least one ignition spark is generable by the pre-chamber spark plug. At the induction stroke of the internal combustion engine, a rinsing of the pre-chamber with inlet gas including at least fuel and air occurs, so that, at the ignition point, an ignitable mixture of fuel and air is accommodated in the pre-chamber.

6 Claims, 1 Drawing Sheet

(51) Int. Cl.
*F02B 19/12* (2006.01)
*F02B 19/10* (2006.01)
*F02B 23/10* (2006.01)

(52) U.S. Cl.
CPC ............ *F02B 19/12* (2013.01); *F02B 23/101* (2013.01); *F02B 23/105* (2013.01)

(58) Field of Classification Search
USPC ........ 123/260, 263, 266, 286, 290, 291, 293
See application file for complete search history.

(56) References Cited

U.S. PATENT DOCUMENTS

| | | | | |
|---|---|---|---|---|
| 4,332,224 | A | * | 6/1982 | Latsch ................ F02B 19/1004 123/254 |
| 4,416,228 | A | | 11/1983 | Benedikt et al. |
| 4,513,708 | A | | 4/1985 | Latsch et al. |
| 4,712,525 | A | * | 12/1987 | Ishida ..................... F02B 19/12 123/263 |
| 4,892,070 | A | | 1/1990 | Kuhnert |
| 7,281,515 | B2 | * | 10/2007 | Mann ................. F02M 21/0263 123/305 |
| 8,324,792 | B2 | | 12/2012 | Maul et al. |
| 9,677,459 | B2 | * | 6/2017 | McClendon .......... F02B 19/108 |
| 2006/0096570 | A1 | * | 5/2006 | Tourteaux ............... F02B 19/12 123/266 |
| 2011/0146618 | A1 | | 6/2011 | LaPointe et al. |
| 2014/0261296 | A1 | | 9/2014 | Sotiropoulou et al. |
| 2015/0176474 | A1 | | 6/2015 | Tozzi et al. |
| 2016/0245151 | A1 | * | 8/2016 | Yuuki ..................... F02B 19/08 |
| 2016/0326946 | A1 | * | 11/2016 | Willi ....................... F02B 19/08 |

FOREIGN PATENT DOCUMENTS

| | | |
|---|---|---|
| DE | 31 48 296 A1 | 9/1982 |
| DE | 37 09 976 A1 | 10/1988 |
| DE | 197 23 182 A1 | 12/1998 |
| DE | 10 2004 039 818 A1 | 3/2006 |
| DE | 10 2010 010 109 A1 | 9/2011 |
| DE | 10 2012 102 009 B4 | 9/2012 |
| DE | 10 2014 004 943 A1 | 2/2015 |
| JP | 2004308656 A * 11/2004 ............ F02B 23/101 |
| JP | 2010-96089 A | 4/2010 |

OTHER PUBLICATIONS

German Search Report issued in German application No. 10 2017 009 228.1 dated Jun. 6, 2018, with Statement of Relevancy (Eleven (11) pages).

* cited by examiner

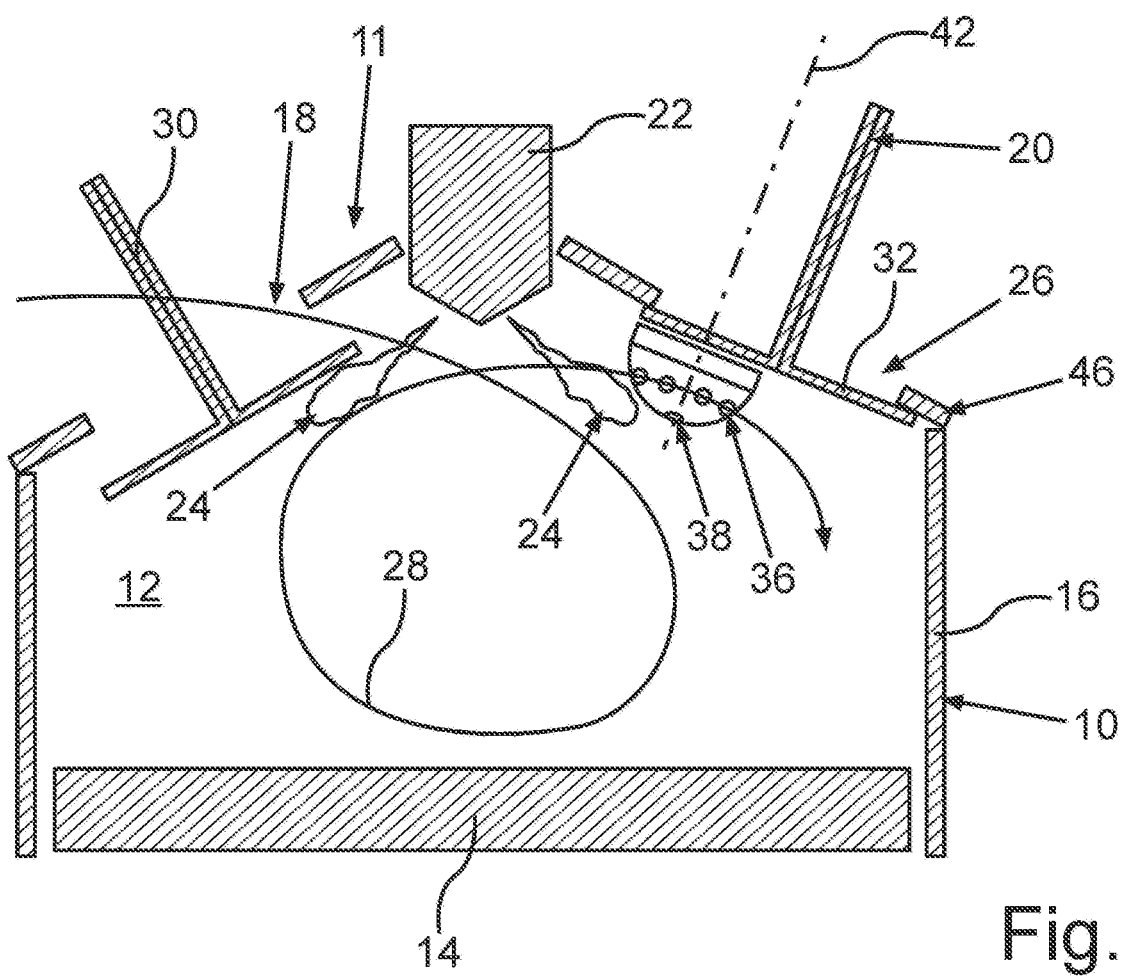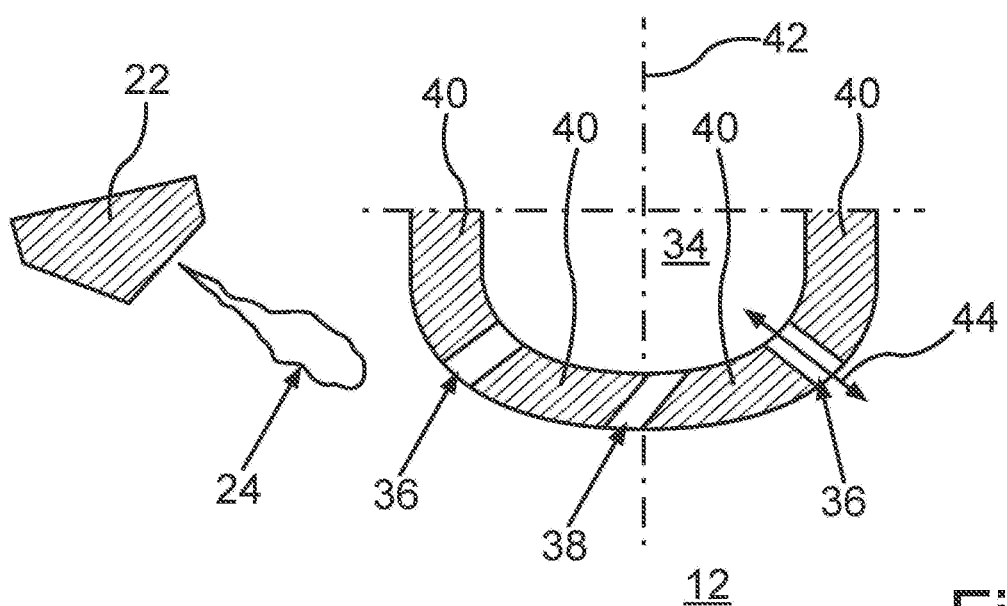

INTERNAL COMBUSTION ENGINE FOR A MOTOR VEHICLE

BACKGROUND AND SUMMARY OF THE INVENTION

The invention relates to an internal combustion engine for a motor vehicle.

Such an internal combustion engine for a motor vehicle is, for example, known from DE 10 2014 004 943 A1. The internal combustion engine here has at least one cylinder for receiving a piston and a pre-chamber spark plug which is allocated to a combustion chamber in the cylinder. The pre-chamber spark plug has a pre-chamber which is fluidically connected with the combustion chamber via several openings designed as through-openings. In the pre-chamber, at least one ignition spark is generable by means of the pre-chamber spark plug, in particular by means of at least one electrode of the pre-chamber spark plug, in order to ignite for example a fuel-air mixture in the pre-chamber by means of the pre-chamber spark.

In addition, DE 10 2010 010 109 A1 discloses a pre-chamber spark plug having a housing that has a pre-chamber with several openings on its front end.

From DE 197 23 182 A1 a method of ignition and combustion in the internal combustion engine is known.

The object of the present invention is to further develop an internal combustion engine according to the aforementioned type, so that a particularly advantageous operation of the internal combustion engine can be implemented.

In order to further develop an internal combustion engine for a motor vehicle of the type specified herein in such a way that a particularly advantageous and in particular efficient and low-emission operation of the internal combustion engine can be implemented, it is provided according to the invention that, in particular during an operation of the internal combustion engine, during an induction stroke of the internal combustion engine, a rinsing of the pre-chamber with inlet gas comprising at least fuel and air occurs, so that, at the ignition point, an ignitable mixture of fuel and air is accommodated in the pre-chamber. At the ignition point, by means of the pre-chamber spark plug, in particular by means of an electrode of the pre-chamber spark plug arranged at least partially in the pre-chamber, the at least one ignition spark is generated in the pre-chamber in order to thereby ignite an ignitable mixture comprising at least fuel and air in the combustion chamber. Since, at the point of ignition, the aforementioned ignitable mixture of fuel and air is accommodated in the pre-chamber, by means of the at least one ignition spark the ignitable mixture of fuel and air accommodated in the pre-chamber can be safely accommodated and burn through so that the mixture ignited in the pre-chamber can enter the combustion chamber via openings in the pre-chamber, whereby the mixture of fuel and air can be safely ignited in the combustion chamber and, as a result, burn through.

The internal combustion engine according to the invention is preferably designed as a spark ignition engine, wherein, in comparison to conventional internal combustion engines, in particular spark ignition engines, the ignition conditions in the combustion chamber can be improved. The invention is based in particular on the following insight: during development, in particular further development, of spark ignition engine combustion methods, it can result in a premature ignition in the combustion chamber due to the fact that internal combustion engines such as, for example, spark ignition engines, are increasingly designed according to the downsizing principle and, with the use of so-called poor-quality fuels, which are of a lower quality, in particular in connection with extreme pressure waves such as for example an isolator which projects into the combustion chamber made from ceramics, could break a conventional standard spark plug not designed as a pre-chamber spark plug by a highly indexed transverse force. This can be avoided by the use of the pre-chamber spark plug, since the pre-chamber is a virtually closed space in which, for example, the previously mentioned isolator is accommodated. In particular in regions in which the openings are not provided, the pre-chamber is fluidically separated from the combustion chamber, in particular by means of the wall regions of the pre-chamber spark plug limiting e respective openings. The wall regions, by means of which the pre-chamber is separated from the combustion chamber, have, for example, in sum, a first total area, wherein for example the openings, via which the pre-chamber is connected with the combustion chamber, have in sum a second total area. In this way the first total area is for example larger than the second total area, whereby the ceramic or the electrode named above can be protected particularly advantageously.

It has, however, been found that a corresponding design of the pre-chamber spark plug, in particular with respect to its hole geometry is necessary in order to facilitate or ensure a desired function of the pre-chamber spark plug in the entire characteristic map or in all operating ranges. In particular, it is desirable, in the entire characteristic map or in all operating ranges, by means of which the internal combustion engine is driven, to effect a safe ignition and burning of the mixture in the combustion chamber, which can be ensured in the internal combustion engine according to the invention.

In particular in an operating range with a low filling or low pressure in the combustion chamber, an ignition and burning of the mixture in the internal combustion chamber can be ensured in the case of an internal combustion engine according to the invention, even with low load, by throttling or in the case of a small cam displacement. Operating ranges with low charging motions, in particular in the case of low rotational speeds and small cam displacement, can also ensure an ignition and burning of the mixture in the combustion chamber, since the ignition of the mixture of fuel and air can be ensured in the pre-chamber. The ignition of the mixture of fuel and air accommodated in the pre-chamber results for example in burning flames which enter via the openings out of the pre-chamber out of and into the combustion chamber. By means of the burning flames, the mixture of fuel and air is ignited in the combustion chamber, which results in a desired burning of the mixture of fuel and air in the combustion chamber.

When operating a conventional internal combustion engine, designed in particular as a spark ignition engine with a pre-chamber spark plug, it is provided that, during the compression stroke of the internal combustion engine, also known as a compression phrase, combustible mixture is pressed out of the combustion chamber via the openings into the pre-chamber, wherein the combustible mixture pressed into the pre-chamber is ignited in an at least virtually inert atmosphere and, after a passing through the pre-chamber via the openings and into the combustion chamber, the mixture of fuel and air which is found there is ignited, in particular completely. It has, however, been found that under low loads and/or emaciation, an amount of the mixture which is pressed out of the combustion chamber into the pre-chamber in the manner described is not sufficient to produce an ignitable mixture in the pre-chamber, in particular at a spark gap of the spark plug.

In order to avoid this problem, it is provided that the openings also marked as holes, in particular with respect to their position and/or geometry, are designed in such a way that, in the intake stroke also marked as an intake phase, a sufficient flushing of the pre-chamber with the inlet gas named above occurs, wherein the flushing results in an ignitable mixture of fuel and air at the ignition point. Since the pre-chamber is rinsed with inlet gas which comprises at least air and fuel during the intake stroke and not during the compression stroke, it can be ensured that, at the ignition point, an ignitable and thus burnable mixture is found in the pre-chamber and in particular in a spark gap. In the internal combustion engine according to the invention, in particular in the case of low loads and/or an emaciation, it can be ensured that, at the ignition point, an ignitable and thus burnable mixture of fuel and air is found in the pre-chamber so that in such operating conditions, the mixture can be safely ignited as a whole and, as a result, burned.

One of the openings is designed as a central opening, while the respective other openings are designed as secondary openings which are designed to be distributed in a peripheral direction of the pre-chamber spark plug around the central opening, in particular equally distributed. The secondary openings, also marked as radial holes or radial openings, are for example arranged or designed symmetrically to the spark plug with respect to a longitudinal axis, in particular a longitudinal central axis, in particular, rotationally symmetrically, wherein for example the longitudinal axis cuts the central opening also marked as a central hole. Here, the central opening is, for example, arranged or designed symmetrically, in particular rotationally symmetrically with respect to the longitudinal axis. The secondary openings must not necessarily be arranged at the same height as the central opening, in particular along the longitudinal axis and thus in a direction of longitudinal extension direction of the pre-chamber spark plug.

Here, the openings have respective passage directions. The respective passage direction is understood to mean a direction along which, for example, the flames named above or the inlet gas can flow through the respective opening designed as a through opening. In other words, the respective opening is arranged in a plane, wherein the passage direction runs perpendicularly to the plane.

It is provided that the passage direction of the central opening runs diagonally to the respective passage direction of the respective secondary opening. In this way a sufficient rinsing of the pre-chamber with a sufficient amount of inlet gas can be ensured. Rinsing is in particular understood to mean that the inlet gas named, in particular in a sufficient amount, can flow out of the combustion chamber via the respective openings into the pre-chamber, and this already during the intake stroke. Within the rinsing, an advantageous amount of inlet gas stays in the pre-chamber so that, at the point of ignition, an ignitable mixture of air and fuel is accommodated in the pre-chamber by means of the spark plug, in particular by means of the ignition spark. Because the passage direction of the central opening runs diagonally to the respective passage direction of the respective secondary opening, a particularly advantageous rinsing or flushing of the pre-chamber can be ensured.

The passage direction of the central opening runs diagonally to the direction of longitudinal extension direction and thus diagonally to the longitudinal axis of the pre-chamber spark plug. In this way, a particularly high amount of inlet gas can in particular flow out of the ignition chamber via the central opening and thus via the openings as a whole into the pre-chamber, so that, at the ignition point, a particularly high amount of the ignitable mixture of fuel and air is accommodated in the pre-chamber.

In the internal combustion engine according to the invention, in particular in operating modes with a high exhaust gas recirculation rate and/or with high charge combustion and charge stratification, for example during an operation where $\lambda$ is in a range from 1.0 to 2.2, it can be ensured that the mixture is ignited in the combustion chamber.

It has been shown to be particularly advantageous when the internal combustion engine has at least one injector allocated to the combustion chamber, by means of which the fuel designed in particular as a fluid fuel for driving the internal combustion engine, in particular under the formation of a so-called spray, can be injected or is injected directly into the combustion chamber. Here, the injector is designed preferably as a Piezo-A injector or as a multi-hole injector, in particular designed with variable hole geometry and/or with variable pressure. In addition, in the case of the internal combustion engine according to the invention, a particularly high robustness against premature ignition can be implemented, so that the danger of causing a breakage of the ceramic isolator of the pre-chamber spark plug as a result of pressure waves can be kept particularly low.

In order to implement a particularly advantageous rinsing of the pre-chamber, it is provided according to the invention that the central opening is, on the combustion chamber side, that is to say in a place or on a side at or on which the central opening feeds into the combustion chamber, inclined in the direction spray, also called fuel spray, formed by the fuel that is injected directly into the combustion chamber by means of the injector.

In order to implement a particularly advantageous charging movement in the pre-chamber, it is provided in a further embodiment of the invention that the respective secondary opening and the central opening have diameters which differ from one another. In this way, an ignitable mixture of fuel and air can be implemented in the pre-chamber in a particularly advantageous manner.

It is conceivable that the central opening and the respective secondary opening have the same diameter. It has, however, been shown to be particularly advantageous when the diameter of the central opening is larger than the respective diameter of the respective secondary opening, by means of which an ignitable mixture of fuel and air can be produced in a particularly advantageous manner in the pre-chamber.

A further embodiment is characterised by the fact that the secondary openings each have a respective diameter which lies in a range of from 0.7 millimeters to 1.4 millimeters inclusive. In this way, a particularly advantageous rinsing of pre-chamber can be represented.

It has been shown to be additionally particularly advantageous when the central opening has a diameter which lies in a range of from 0.8 millimeters to 1.6 millimeters inclusive. In his way, the pre-chamber can be rinsed particularly advantageously with inlet gas. Finally, it has been shown to be advantageous when the secondary openings effect a rotational flow of the inlet gas in the pre-chamber, whereby a particularly advantageous ignitability of the mixture of fuel and air can be ensured in the pre-chamber.

Further advantages, features and details of the invention arise from the following description of preferred exemplary embodiments as well as with the aid of the drawings. The features and feature combinations described in the description above as well as the features and feature combinations shown below in the description of the figures and/or shown solely in the figures are applicable not only in the respectively specified combination, but also in other combinations or on their own, without exceeding the scope of the invention.

BRIEF DESCRIPTION OF THE DRAWINGS

FIG. 1 is a sectional schematic section view of an internal combustion according to the invention for a motor vehicle; and FIG. 2 is a further sectional schematic section view of the internal combustion engine.

DETAILED DESCRIPTION OF THE DRAWINGS

FIG. 1 shows sectionally, in a schematic section view, an internal combustion engine of a motor vehicle generally marked with 10 which is preferably designed as a spark ignition engine, in particular for a motor vehicle, such as for example a passenger vehicle. The internal combustion engine 10 is designed as a reciprocating engine and has at least one combustion chamber 12 in a cylinder 16. In addition, the internal combustion engine 10 has a piston 14 allocated to the cylinder 16, which is accommodated in a translationally moveable manner in the cylinder 16. The combustion chamber 12 is enclosed in the cylinder 16 by the piston 14 and a cylinder head 11 which closes the cylinder. The cylinder 16 is at least partially formed by a motor housing of the internal combustion engine 10 which is not represented in detail, which is designed in particular as a cylinder housing or as a cylinder crankcase. The piston 14 can move in the cylinder 16 between an upper dead point and a lower dead point. The internal combustion engine 10 is designed as a 4-stroke engine, so that exactly one working cycle of the internal combustion engine 10 comprises exactly four strokes. Here, exactly one working cycle of the internal combustion engine 10 extends over 720-degree crankshaft angle of a drive shaft designed as a crankshaft which is hingedly connected to the piston 14 via a connecting rod not represented in the figures. Through this hinged coupling, the translational movements of the piston 14 can be transformed into a rotational movement of the crankshaft. Here, the working cycle comprises exactly two complete revolutions and thus 720-degree crankshaft angle of the crankshaft.

A first of the strokes is, for example, an intake stroke also marked as an intake phase, under which the piston 14 moves out of its upper dead point into its lower dead point and, in doing so, sucks at least air into the combustion chamber 12 via at least one intake port 18 allocated to the cylinder 16. A second of the strokes is a compression stroke connecting to the intake stroke also marked as a compression phase, in the scope of which the piston 14 moves out of its lower dead point into its upper dead point and, in doing so, compacts or compresses the air previously sucked into the combustion chamber 12.

The internal combustion engine 10 further has a pre-chamber spark plug 20 allocated to the cylinder 16, by means of which, at an ignition point, at least one ignition spark is generable or is generated. By means of the ignition spark, a mixture which is accommodated in the combustion chamber of the cylinder 16, which comprises the air sucked in and an in particular liquid fuel for operating the internal combustion engine 10, is ignited and, as a result, burned. The fuel is, for example, injected, in particular directly, into the combustion chamber 12 of the cylinder 16 by means of an injector 22 of the internal combustion engine 10 allocated to the cylinder 16, in particular under the formation of a so-called spray 24. This means that the spray 24, also marked as fuel spray, is formed by the fuel which is directly injected into the combustion chamber 12 by means of the injector 22.

Due to the ignition and the resulting burning of the mixture of fuel and air in the combustion chamber 12, the mixture expands, whereby the piston 14, in the scope of a third of the strokes, moves out of its upper dead point into its lower dead point, and, in doing so, is driven. As a result, the crankshaft is driven. The third stroke is also referred to as a working cycle. The fourth stroke which connects to the working cycle is also marked as an exhaust stroke, in the scope of which exhaust fumes which result from the burning of the mixture are pushed out of the combustion chamber 12 by means of the piston 14 via an exhaust passage 26.

In FIG. 1, an arrow 28 illustrates a charging movement and thus for example a flow of the air flowing into the combustion chamber 12. An inlet valve 30 is allocated to the intake port 18 which is moveable, in particular translationally, between at least one closed position and at least one open position relative to the cylinder head 11. In addition, an exhaust valve 32 is allocated to the exhaust passage 26, which is likewise translationally moveable between at least one closed position and at least one open position relative to the cylinder head 11. Here, FIG. 1 shows the intake stroke, in the scope of which the piston 14 moves downwards. In particular, the arrow 28 shows the global charging movement in the combustion chamber 12, wherein a tumble-like charging movement is provided. In this way, the inlet valve 30 is opened and releases the intake port 18, while the exhaust valve 32 is closed and locks the exhaust passage 26.

When viewed together with FIG. 2, it can be recognized particularly well that the pre-chamber spark plug 20 has a pre-chamber 34 which is fluidically connected with the combustion chamber 12 via openings 36 and 38. Here, the pre-chamber 34 is limited by or formed by respective wall regions 40 of the pre-chamber spark plug 20, wherein the openings 36 and 38 designed as through openings are formed in the wall regions 40. In the pre-chamber 34, for example, at least one electrode is arranged which is not recognisable in the figures and is embedded at least partially in an isolator, wherein the isolator can be formed of a ceramic and is a component of the pre-chamber spark plug 20. By means of the electrode, at the ignition point the at least one ignition spark is produced.

In order to now ignite the mixture in the combustion chamber 12 in a particular safe manner in the entire characteristic map as well as in all operating modes of the internal combustion engine, and thus be able to implement a particularly advantageous operation of the internal combustion engine, at the intake stroke of the cylinder 16, a rinsing of the pre-chamber 34 with the inlet gas comprising at least the gas and the air occurs, so that at the point of ignition an ignitable mixture of fuel and air is accommodated in the pre-chamber 34.

From FIGS. 1 and 2, it can be recognized particularly well that the opening 38 is designed as a central opening, while the openings 36 are designed as secondary openings. The secondary openings are also marked as radial openings or radial bores, wherein the opening 38 is also marked as a central bore, At least the secondary openings are arranged or configured symmetrically, in particular rotationally symmetrically, with respect to a longitudinal axis 42 of the pre-chamber spark plug 20 designed in particular as a longitudinal central axis of the pre-chamber spark plug 20, wherein the secondary openings are arranged distributed, in particular equally distributed, in a peripheral direction of the pre-chamber spark plug 20 around the central opening.

From FIG. 2, it can be seen with the aid of one of the secondary openings that the respective opening 36 or 38 has a passage direction shown in FIG. 2 by a double arrow 44, along which for example the inlet gas can flow out of the combustion chamber 12 through the respective opening 36 or 38 into the pre-chamber 34. Here, the passage directions of the secondary openings run diagonally to the longitudinal axis 42 and diagonally to the passage direction of the opening 38, wherein the passage direction of the opening 38 runs diagonally to the longitudinal axis 42. The opening 38 is thus designed as a diagonal central bore which is preferably aligned in a direction of the injector 22 or of the spray 24 and is thus oriented in a rotational position. In other words, the central opening on the combustion chamber side is tilted in the direction of the spray 24 or in the direction of the injector 22, so that the central opening on the side of the combustion chamber 12 is arranged closer to the injector 22 or the spray 24 than on the side of the pre-chamber 34. In particular it is conceivable that the respective opening 36 and the central opening have the same diameters, in particular inner diameters.

The pre-chamber spark plug 20 is, in particular with respect to its hole geometry, preferably designed in such a way that a sufficient number of secondary openings is provided in order to achieve rotational position independence in the combustion chamber 12. This is advantageous for series application due to installation tolerances. The central opening serves for an advantageous gas exchange between the combustion chamber 12 and the pre-chamber 34. Respective sizes, diameters or flow cross-sections of the openings 36 and 38, through which the inlet gas can flow, are, for example, chosen so that one the one hand, a sufficient shielding of the pre-chamber 34 and thus of an isolator of the electrode of the pre-chamber spark plug 20 guarantees against pressure waves out of the combustion chamber 12 and on the other hand, a sufficient rinsing of the pre-chamber 34 with the inlet gas is ensured. If the openings 36 and 38 are too large, a propagation of flame out of the pre-chamber 34 into the combustion chamber 12 deteriorates and pressure waves could penetrate the pre-chamber 34. If the openings 36 and 38 are too small, the rinsing of the pre-chamber 34 and thus the running limit in the direction of small loads and the lean-burn running limit decreases. Above the pre-chamber 34, the pre-chamber spark plug 20 is designed, for example, as a standard spark plug without a pre-chamber.

Preferably the pre-chamber spark plug 20 is arranged as far as possible on the edge 46 of the combustion chamber 12 in order to virtually not disturb the flow in the combustion chamber 12 and to provide as little working surface for spray or charging movement as possible. In this way, an overheating of the pre-chamber 34 is in particular avoidable under high loads, in order to be able to avoid auto-ignition. In this context, the initial mixture which is found in the combustion chamber 12 should already flow during the intake phase through the openings 36 and 38 into the pre-chamber 34, in order to already rinse the pre-chamber 34—which is for example filled with exhaust gas on account of the exhaust stroke in the intake phase with inlet gas, and in order to bring a flammable mixture of fuel and air into the pre-chamber 34. It is additionally advantageous when the pre-chamber 34 extends sufficiently far into the combustion chamber 12.

In addition, the arrow 28 illustrates, for example, an intake flow, by which, for example, the spray 24 brought into the combustion chamber 12 is taken along in such a way that, already in the intake phase, inlet gas or a mixture of fuel and air flows in the direction of the pre-chamber spark plug 20 and thus into the pre-chamber 34, in particular out of the combustion chamber 12 via the openings 36 and 38. For this purpose, a corresponding positioning of the pre-chamber 34 is advantageous.

For this, it is further advantageous when the radial openings or secondary openings are designed to be sufficiently large and, in doing so, have for example a diameter, in particular an inner diameter, which lies in a range of from 0.7 millimeters to 1.4 millimeters inclusive. In addition, a sufficiently large number of radial holes is advantageous, wherein the number of radial holes preferably lies in a range of from four to 12 inclusive. In other words, preferably at least four and in particular at most 12 secondary openings are provided. Also a sufficiently large diameter, in particular inner diameter, of the central opening is advantageous. The diameter of the central opening is, for example, as large as or larger than the diameter of the respective secondary opening, wherein the diameter, in particular the inner diameter, of the central opening preferably lies in a range of from 0.8 millimeters to 1.6 millimeters inclusive. Flow effects around the pre-chamber 34 and in the pre-chamber 34 itself can result in a gas exchange in the intake phase of the working cycle.

The radial openings are preferably employed in such a way that, due to a tangential flow of the inlet gas into the pre-chamber 34, in particular in its interior, it arises in particular that, in the interior of the pre-chamber 34, a rotational flow, in particular of the inlet gas flowing into the pre-chamber occurs. The central opening is, in this way, preferably designed in such a way that it shows on the combustion chamber side relative to the injector 22 and thus relative to the spray 24, so that during an injection process, in which the fuel is directly injected into the combustion chamber 12 by means of the injector 22 by forming the spray 24, an as high as possible amount of the mixture of fuel and air or of the inlet gas is introduced into the pre-chamber 34 as a result of a dynamic pressure resulting from the flow direction. For this purpose the pre-chamber spark plug 20 is preferably installed, in particular screwed in, and oriented in a rotational position, in order to ensure an advantageous alignment of the central opening relative to the injector 22. In this way, the spray design of the injector 22 which is designed for example as a multi-hole injector, as well as the injection timing, that is to say the time of injection, at which the fuel is directly injected into the combustion chamber 12, is chosen so that during as large a temporal phase of the intake phase as possible, inlet gas, that is to say a mixture of fuel and air, can flow in particular out of the combustion chamber 12 via the openings 36 and 38 into the pre-chamber 34.

LIST OF REFERENCE CHARACTERS

10 Internal combustion engine
11 Cylinder head
12 Combustion chamber
14 Piston
16 Cylinder
18 Intake port
20 Pre-chamber spark plug
22 Injector
24 Spray
26 Exhaust passage
28 Arrow
30 Inlet valve 32 Exhaust valve
34 Pre-chamber
36 Openings
38 Opening
40 Wall region
42 Longitudinal axis
44 Double arrow
46 Edge

The invention claimed is:

1. An internal combustion engine for a motor vehicle, comprising:
   a cylinder for accommodating a piston, wherein the cylinder defines a combustion chamber;
   a pre-chamber spark plug allocated to the combustion chamber;
   a pre-chamber that is fluidically connected with the combustion chamber via a central opening and a plurality of secondary openings, wherein in the pre-chamber an ignition spark is generable by the pre-chamber spark plug and wherein, at an induction stroke of the internal combustion engine, a rinsing of the pre-chamber with inlet gas that includes fuel and air occurs such that, at an ignition point, an ignitable mixture of filet and air is accommodated in the pre-chamber;
   wherein the plurality of secondary openings are arranged distributed in a peripheral direction of the pre-chamber spark plug around the central opening, wherein a passage direction of the central opening runs diagonally to a respective passage direction of the plurality of secondary openings, and wherein the passage direction of the central opening runs diagonally to a longitudinal extension direction of the pre-chamber spark plug;
   wherein the plurality of secondary openings are arranged with rotational symmetry relative to the longitudinal extension direction, wherein the longitudinal extension direction cuts the central opening, and wherein the central opening is inclined on a combustion chamber side in a direction of a fuel spray formed by a fuel injected directly into the combustion chamber by an injector.

2. The internal combustion engine according to claim 1, wherein a size of a respective diameter of the plurality of secondary openings differs from a size of a diameter of the central opening.

3. The internal combustion engine according to claim 2, wherein the size of the diameter of the central opening is greater than the size of the respective diameter of the plurality of secondary openings.

4. The internal combustion engine according to claim 1, wherein the plurality of secondary openings each have a diameter which lies in a range from 0.7 millimeters to 1.4 millimeters inclusive.

5. The internal combustion engine according to claim 1, wherein the central opening has a diameter which lies in a range from 0.8 millimeters to 1.6 millimeters inclusive.

6. The internal combustion engine according to claim 1, wherein the plurality of secondary openings effect a rotational flow of the inlet gas in the pre-chamber.

* * * * *